United States Patent
Koller et al.

(10) Patent No.: US 11,752,952 B2
(45) Date of Patent: Sep. 12, 2023

(54) METHOD FOR ALIGNING A CAMERA OF A VEHICLE CAMERA MONITOR SYSTEM AND VEHICLE

(71) Applicant: MOTHERSON INNOVATIONS COMPANY LIMITED, London (GB)

(72) Inventors: Matthias Koller, Stuttgart (DE); Alexander Slama, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 17/242,553

(22) Filed: Apr. 28, 2021

(65) Prior Publication Data
US 2021/0339686 A1    Nov. 4, 2021

(30) Foreign Application Priority Data
Apr. 30, 2020   (DE) ............... 10 2020 111 865.1

(51) Int. Cl.
*B60R 11/04* (2006.01)
*B60R 1/00* (2022.01)

(52) U.S. Cl.
CPC ............ *B60R 11/04* (2013.01); *B60R 1/00* (2013.01); *B60R 2300/105* (2013.01); *B60R 2300/108* (2013.01); *B60R 2300/605* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 2010/0103540 A1* | 4/2010 | An | G02B 7/022 359/720 |
| 2016/0167583 A1* | 6/2016 | Schrepfer | B60R 1/00 348/148 |
| 2018/0307009 A1* | 10/2018 | Lang | H04N 5/2254 |
| 2019/0184900 A1* | 6/2019 | Lang | H04N 5/23238 |
| 2020/0344450 A1* | 10/2020 | Lang | G06T 3/60 |

FOREIGN PATENT DOCUMENTS

DE    102017108569 A1    10/2018
EP         3272589 B1 *    5/2019    ............ B60R 11/04

OTHER PUBLICATIONS

German Office Action dated Dec. 3, 2020 of application No. DE 10 2020 111 865.1.
ECE Regulation No. 46, Uniform provisions concerning the approval of devices for indirect vision and of motor vehicles with regard to the installation of these devices, Jul. 2016.

* cited by examiner

*Primary Examiner* — Rebecca A Volentine
(74) *Attorney, Agent, or Firm* — Jones Day

(57) ABSTRACT

A method for aligning a camera of a vehicle camera monitor system (CMS) includes mounting the camera to a vehicle on one side thereof, the camera having a camera opening angle, providing the camera with at least one image sensor having an entire area of full sensor field of view (FoV), forwarding the image data recorded by the at least one image sensor to a monitor of the CMS to display an image comprising the first area to a driver of the vehicle, and aligning the camera with its camera opening angle such that the first area is at least one of arranged at the horizontal outermost position of the image captured by the image sensor of the camera or at the vertical outermost position of the image displayed on the monitor.

10 Claims, 3 Drawing Sheets

METHOD FOR ALIGNING A CAMERA OF A VEHICLE CAMERA MONITOR SYSTEM AND VEHICLE

CROSS-REFERENCE TO RELATED APPLICATIONS

This application claims the benefit of priority to German Patent Application No. DE 10 2020 111 865.1, filed Apr. 30, 2020, which is hereby incorporated by reference in its entirety for all purposes.

BACKGROUND

1. Field of the Invention

The application refers to vehicle camera monitor systems. In particular the application refers to a method for aligning a camera of a vehicle camera monitor system and a vehicle with a camera monitor system.

An improved method for aligning a camera of a vehicle camera monitor system is provided, wherein the camera is mounted to a vehicle on one side thereof and has a camera opening angle, the camera comprises at least one image sensor having an entire area of full sensor field of view (FoV) comprising at least a first FoV legally-prescribed for a rear view device of the vehicle in form of class II FoV in a first area, the full sensor FoV is defined by the camera opening angle and the alignment of the camera relative to the vehicle, the class II FoV extending from an edge of said side of the vehicle, away from the vehicle, and the image data recorded by the at least one image sensor are forwarded to a monitor of the CMS to display an image comprising the first area to a driver of the vehicle.

2. Related Art

In common current camera monitor systems (CMS), at least one camera is oriented so that the camera field of view (FoV) has class II FoV according to the ECE Guideline R 46 substantially in the center of the optical axis of the camera, as shown in FIG. 4 for a truck 20 driving along a straight road 30. The truck 20 has a cab 22 and a trailer 24, with a camera 1 of a CMS mounted at the driver side on the left side of the cab 22 and a monitor (not shown) of the CMS being provided as substitute for a rear view mirror, as head-up display or the like. The known camera orientation has the advantage that class II FoV, defining a first area 15 to be displayed on the monitor, is recorded with optimum sharpness when driving straight ahead. When the truck 10 is cornering and for class IV FoV, defining a second area 17 to be displayed on the monitor, however, the sharpness decreases because a large area 14 of the recorded section cannot be used.

FIG. 4 also illustrates that the camera opening angle 10 defining an area 11 of the full sensor FoV of the camera 1, which covers two edges areas 12, 13 which do not meet sharpness requirements due to lens effects. Between the two edge areas 12, 13 there is said wasted area 14 which is not used in order to have a maximized sharpness in the area 15 for class II FoV, partly overlapped by the area 17 for class IV FoV. Both the areas 15 and 17 start along the side of the truck 10, rather along the side of the trailer 14 of the truck 10, but with the first area 15 starting with an offset relative to the second area 17 in line with the legal requirements of the ECE Guideline R 46, to which with respect to further details on the different FoV classes reference is made.

EP 2 765 031 B1 refers to a vehicle, in particular commercial vehicle, which is equipped with a viewing system, wherein the viewing system comprises an image capture unit attached to the vehicle, a computing unit connected to the image capture unit, and a reproducing unit connected to the computing unit. The image capture unit comprises a lens, which has an optical axis, and a digital image sensing unit. The image capture unit is attached to the vehicle such that, in use, a viewing area on the side of the vehicle is sensed with at least a part of a first legally-prescribed field of view and at least a part of a second legally-prescribed field of view, wherein the first legally-prescribed field of view is configured such that the driver can see at least a 5 m wide, flat, horizontal portion of the road, which is bounded by a plane parallel to the median longitudinal vertical plane and passing through the outermost point of the vehicle on the driver's side and the passenger's side of the vehicle, respectively, and which extends from 30 m behind the driver's eye to the horizon, and such that the driver can see the road over a width of 1 m, which is bounded by a plane parallel to the median longitudinal vertical plane and passing through the outermost point of the vehicle starting from a point 4 m behind the vertical plane passing through the driver's eye. The lens is disposed with respect to the digital image sensing unit such that the optical axis extends through the part of the first legally-prescribed field of view that is reproduced on the digital image sensing unit, wherein the optical axis is shifted towards the vehicle such that the optical axis extends through the part of the first legally-prescribed field of view.

Another vision system for a vehicle according to WO 2013/019707 A1 includes at least one imaging sensor disposed at the vehicle and having an exterior field of view. The imaging sensor is operable to capture image data. The imaging sensor includes or is associated with an inclination sensor. At least one other inclination sensor is disposed at the vehicle. A processing system is operable to process outputs of the inclination sensors to determine an alignment or misalignment of the at least one imaging sensor at the vehicle.

A method for calibrating and/or aligning a camera mounted in an automobile vehicle is known from EP 2 490 175 A1, where the camera comprises an image sensor and calculation means that can calculate the value of a parameter in a region of interest in the image.

Systems and methods are described in WO 2017/080753 A1 for creating a unified output image based on image data from multiple cameras with overlapping fields of view by converting a raw image from each camera into a rectified output image using a look-up table. Camera misalignments are mitigated by generating an updated look-up table based on feature point detection and matching in the overlapping fields of view.

DE 10 2014 006 153 A1 relates to a method for displaying an indirect field of view in the vehicle environment, in particular for displaying a driver's and/or passenger's rear and field of vision of a vehicle, in particular a commercial vehicle, by means of a camera monitor system. An overall field of view is recorded with at least one camera, in particular by means of a digital camera, of the camera monitor system and displayed on the monitor such that the overall field of view shown on the monitor is divided into several adjoining partial fields of view, which are each shown with different associated magnification factors and/or degrees of distortion.

U.S. Pat. No. 10,284,818 B2 provides a calibration process that uses multiple parallel lines with marks or tick marks for multi-camera image stitching calibration. The calibration system may calibrate the camera and system while the vehicle is moving along a vehicle assembly line. Special targets trigger image capturing while the vehicle is moving. Optionally, the calibration system may utilize user actuatable inputs to provide a manual calibration process that a user can perform while viewing displayed images derived from image data captured by the vehicle cameras. The captured image data includes areas where there are overlapping fields of view of the cameras, with one or more targets or markings disposed at the overlapping regions to facilitate calibration of one or more of the cameras.

There is the need for a simple adjustment of the FoV of a single camera for class II and class IV, while ensuring a high sharpness and FoV exploitation.

SUMMARY

In at least one aspect, the present disclosure describes a method comprising aligning the camera with its camera opening angle such that the first area is arranged at the horizontal outermost position of the image captured by the image sensor of the camera and/or at the vertical outermost position of the image displayed on the monitor.

According to one embodiment the entire area of full sensor FoV comprises two edge areas not meeting the sharpness requirements for the image on the monitor of the rear view device, and the first area is arranged directly next to a first edge area.

With the disclosure it is also proposed that the entire area spans an angle of at least 90°, preferably around 100°, and/or the first edge area and the second edge area each span an angle of up to 5°.

The method of the disclosure can further comprise panning of the first area to a panned first area depending on the cornering situation of the vehicle, in particular when the vehicle is a truck with a cab and a trailer, wherein the camera is mounted to the cab and the class II FoV extends from the edge of the trailer of said side of the vehicle, and the panning is following the bending of the trailer relative to the cab of at least 90°, while passing curves.

Further, it is proposed that the first area is arranged in the upper right region of the monitor simulating a rear view mirror, and the panned first area is arranged in the upper left region of the monitor simulating a rear view mirror.

Embodiments of the present disclosure can still further comprise aligning the class IV FoV extending from the edge of said side of the vehicle, away from the vehicle, together with aligning the class II FoV such that a second area of the class IV class FoV is displayed on the monitor.

It is also proposed that the method of the present disclosure comprises providing a class V FoV within a third area extending from the edge of said side of the vehicle, away from the vehicle, between the second area and the second edge area.

According to the present disclosure it is proposed that the camera is associated with at least one lens, with the lens preferably having an uniform distortion or being a panomorphic lens.

Arranging at least the first area, preferably the first area and the panned first area, the second area and/or the third area, in an image region having a distortion reduced by the lens of the CMS is also proposed with the present disclosure.

In addition, a vehicle, in particular in form of a truck with a cab and a trailer, with a CMS having a single camera mounted to one side of the vehicle and being aligned according to the present disclosure is provided.

It is also proposed that the single camera is at a driver side and/or the vehicle has a single camera at each side thereof.

Thus, the application provides a solution for a CMS with a single camera that can record at least class II FoV and a lens with uniform distortion, to display an image on a monitor of the CMS with the legally required areas. The recorded images can be processed as for example described in US 2018/0224108 to simulate a plan and/or curved rear view mirror.

In short, according to the present application the orientation of a camera is selected such that the camera opening angle is aligned in such a way that the legally required image section, i.e. class II of FoV, is on the horizontal outermost position of the image captured by the image sensor of the camera and/or at the vertical outermost position of the image displayed on the monitor.

This selection is only limited in case the edge areas of the image sensor of the camera cannot meet the sharpness requirements due to lens effects. Therefore, depending on the lens, the distance of the image to the image sensor may vary. Another limitation can be the physical edge of the image sensor when having a curvature.

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of systems consistent with the present description and, together with the description, serve to explain advantages and principles consistent with the invention.

BRIEF DESCRIPTION OF THE DRAWINGS

Further features, details and advantages of the invention are explained in the appended claims, in the drawings and in the description of a preferred embodiment of the head section according to the invention given below.

DETAILED DESCRIPTION

Figure 1A:
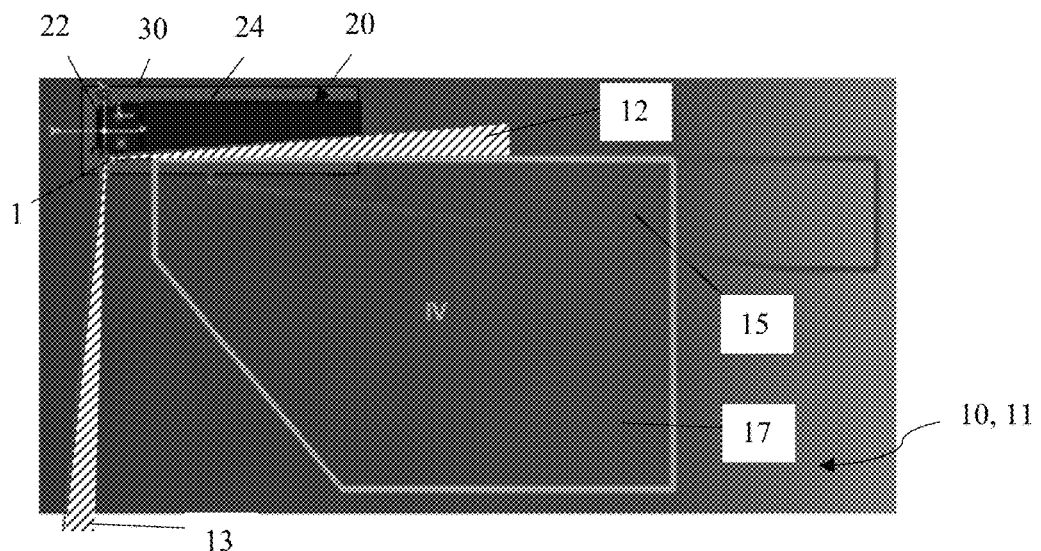
FIGS. 1a, 1b, and 1c are schematic plan views on a truck of the present disclosure driving on a street, illustrating the area of full sensor FoV of a camera of a vehicle camera monitor system, with a straight trailer, a curved trailer and class V FoV, respectively.
Figure 4:
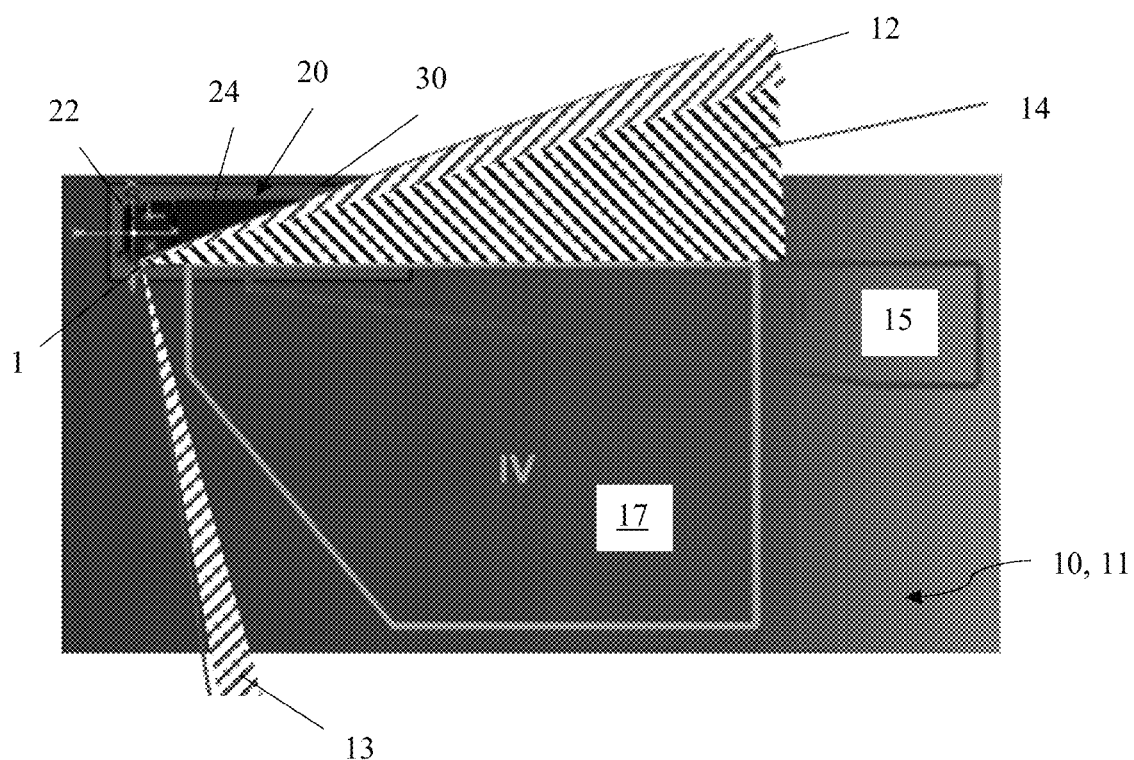
FIG. 4 is a schematic plan view on a truck driving on a street, illustrating the area of full sensor FoV of a camera of a prior art vehicle camera monitor system.

FIG. 1a shows a situation similar to the one already discussed with respect to FIG. 4 with a truck 20 driving on a road 30, with its trailer 24 arranged straight behind its cab 22. But, one camera 1 with a uniform distortion lens (not shown) of a CMS of the truck 20 according to an embodiment of the present disclosure is oriented such that the camera opening angle 10 is aligned in such a way that a first area 15 providing a legally required image section of a rear view device simulating a rear view mirror of the truck 20, i.e. class II of FoV, is arranged on the horizontal outermost position of the image sensor of the camera 1, just next to the first area 15, a first edge area 12 of the FoV does not meet the sharpness requirements, substantially due to lens effects. The same holds for a second edge area 13 of the FoV. First and second edge areas 12, 13 span an angle of up to 5°. This orientation allows to have a sharp image not only in the required class II area 15, but also in a second, class IV area 17.

Figure 2A:
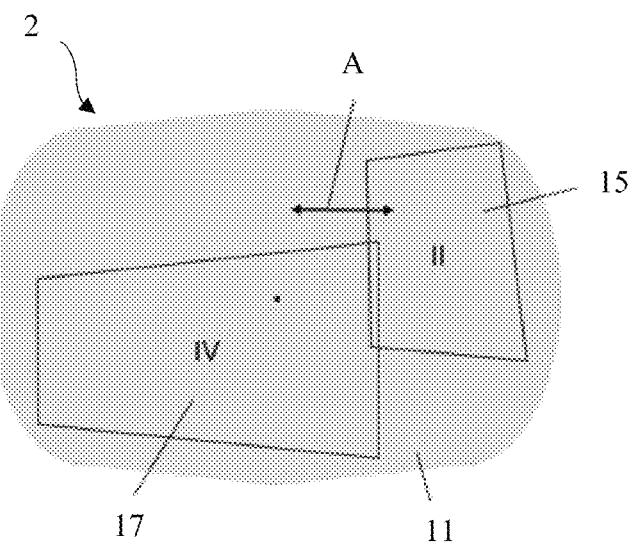
FIGS. 2a, 2b, and 2c are schematic views of the areas defined with respect to FIGS. 1a, 1b and 1c as displayed on a monitor.

FIG. 2a depicts a monitor 2 of the CMS replacing an external rear view mirror attached to the side of the truck 20. The displayed image of the area 11 of the full sensor FoV, comprising the first area 15 and the second area 17 with an improved overall impression as stitched images, allows the driver of the truck 20 to see more details. The first area 15 is shown in the upper right region on the monitor 2.

Figure 1B:
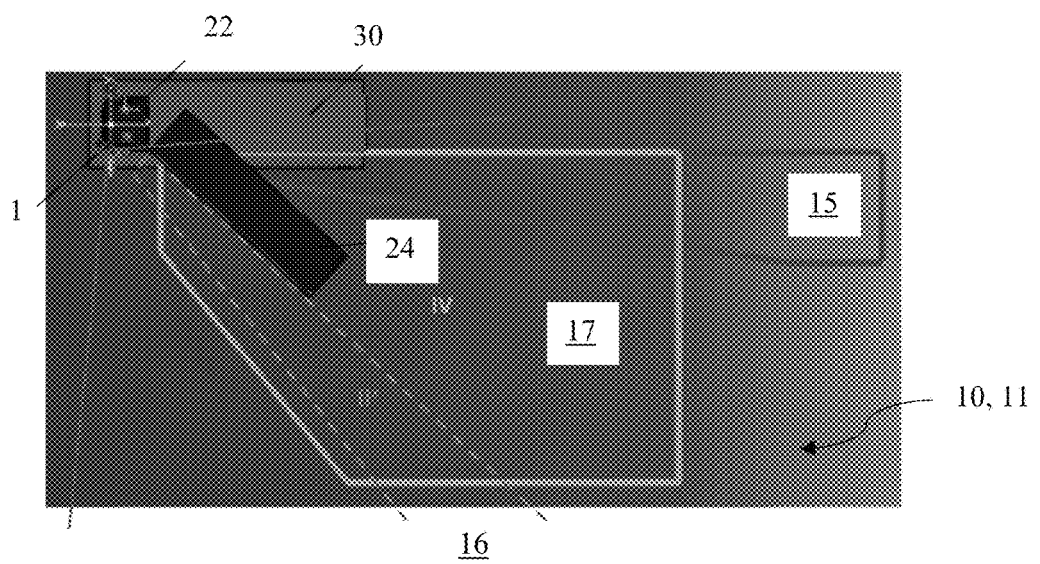

The camera orientation, described with respect to FIGS. 1a and 2a, can achieve the highest possible degree of panning of the first area 15, with a curved trailer 24 as shown in FIG. 1b, depicting a panned first area 16 of class II FoV. E.g. with a camera opening angle of 100° and assuming that an angle region of 5° of the edge area 12 cannot be used due to blurring or an inaccuracy of the image section, the end of the trailer 24 can still be captured at bends of more than 90° due to panning the first area 15 to the panned first area 16. Said panning leads to a shift along the arrows A in FIG. 2b between the upper corner regions of the monitor 2. Thus, the camera orientation achieved with the method of this disclosure allows a very high margin for the panning when cornering forward and backward to allow the end of the trailer 24 still to remain in the panned first area 16, in contrast to the situation with the original first area 15 associated with a straight trailer 24 as shown in FIG. 1b.

Figure 2B:
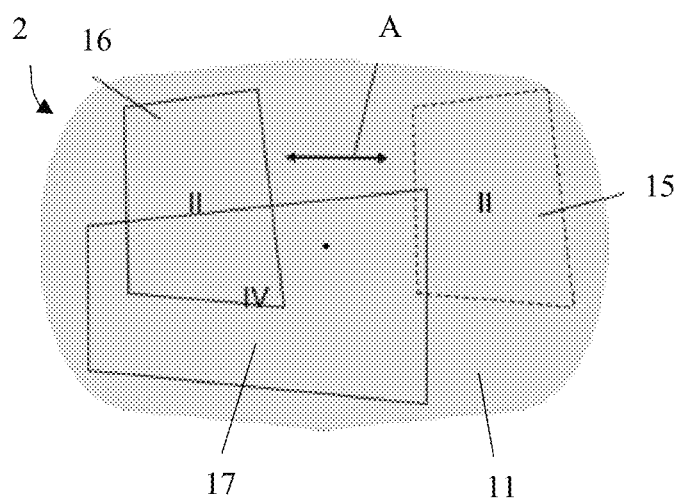

Thus, the alignment described above allows to correct the class II FoV when cornering by panning along the direction A to obtain all required information on the monitor 2 as illustrated in FIG. 2b.

Figure 1C:
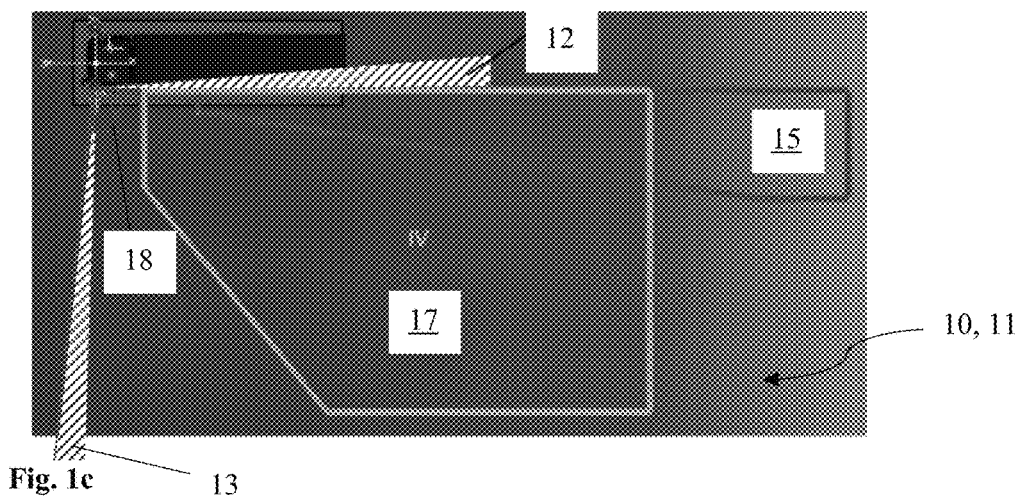
Figure 2C:
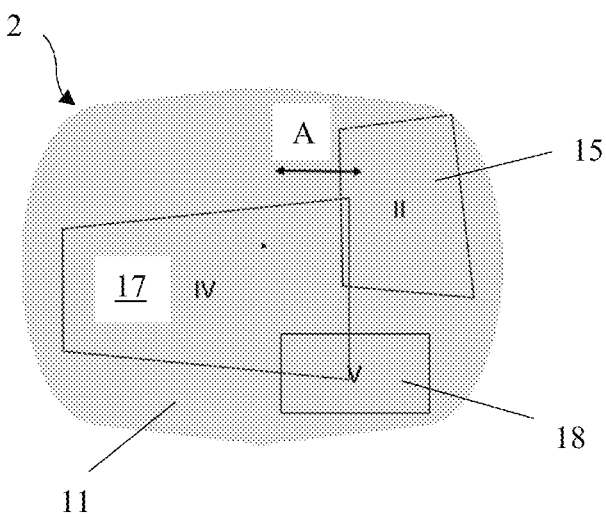

The alignment, in addition to enabling the panning of class II FoV, also allows for observing a third area 18 of class V FoV as shown in FIG. 1c and further illustrated for the monitor image in FIG. 2c. This is due to not wasting a FoV area as indicated with region 14 for prior art camera alignment in FIG. 4. The respectively gained area is between the second area 17 for the class IV FoV and the second edge area 14, which is releasing sufficient area for allowing a recording of the third area 18.

Figure 3:
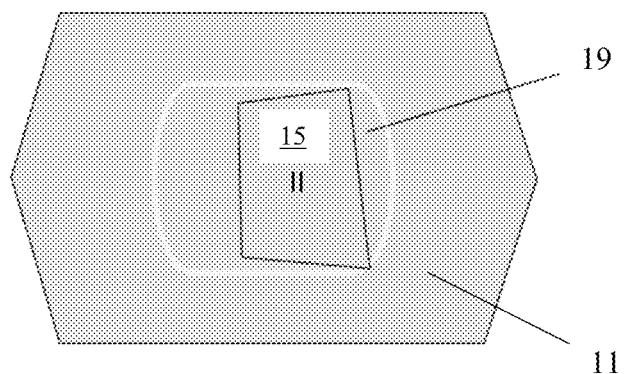
FIG. 3 is a monitor view illustrating the effect of a panomorphic lens.

While the alignment described with respect to FIGS. 1a to 2c has been achieved with a uniform distortion lens, the camera alignment of the present disclosure can also be applied to panomorphic lenses, with the camera being aligned, in addition, as shown in FIG. 3, such that the first area 15 of the class II FoV is arranged in the low distortion area 19 of the lens. In this case, the range for panning without sharpening loss is smaller compared to the case with an uniform distortion lens.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1 camera of CMS
2 monitor
10 camera opening angle
11 area of full sensor FoV
12 edge area of FoV
13 edge area of FoV
14 not used area of FoV
15 area of class II FoV
16 panned area of class II FoV
17 area of class IV FoV
18 area of class V FoV
19 area of low distortion
20 truck
12 cab
24 trailer
30 street
A panning direction

What is claimed is:

1. A method for aligning a camera of a vehicle camera monitor system (CMS), comprising:
    mounting the camera to a vehicle on one side thereof, the camera having a camera opening angle;
    providing the camera with at least one image sensor having an entire area of full sensor field of view (FoV) comprising at least a first FoV legally-prescribed for a rear view device of the vehicle in form of class II FoV in a first area;
    the full sensor FoV being defined by the camera opening angle and the alignment of the camera relative to the vehicle;
    the class II FoV extending from an edge of said side of the vehicle, away from the vehicle;
    forwarding the image data recorded by the at least one image sensor to a monitor of the CMS to display an image of the first area to a driver of the vehicle;
    aligning the camera with its camera opening angle such that the image of the first area is arranged in at least one of the horizontal outermost position of the image captured by the image sensor of the camera or at the vertical outermost position of the image displayed on the monitor, wherein the entire area of full sensor FoV comprises two edge areas not meeting legally prescribed sharpness requirements for the image on the monitor of the rear view device, and the first area is arranged directly next to a first edge area, and
    panning the image of the first area from an upper right corner region to an upper left corner region for display on the monitor simulating a rear view mirror.

2. The method of claim 1, further comprising panning of the first area to a panned first area depending on a cornering situation of the vehicle, and when the vehicle is a truck with a cab and a trailer, wherein the camera is mounted to the cab and the class II FoV extends from the edge of the trailer of said side of the vehicle, and the panning is following the bending of the trailer relative to the cab of at least 90° while passing curves.

3. The method of claim 1, further comprising aligning a class IV FoV extending from the edge of said side of the vehicle, away from the vehicle, together with aligning the class II FoV such that a second area of the class IV class FoV is displayed on the monitor.

4. The method of claim 3, further comprising providing a class V FoV within a third area extending from the edge of said side of the vehicle, away from the vehicle, between the second area and the second edge area.

5. The method of claim 1, wherein the camera is associated with at least one lens, with the lens having a uniform distortion or being a panomorphic lens.

6. The method of claim 5, further comprising arranging at least the first area in an image region having a distortion reduced by the lens of the CMS.

7. The method of claim 1, wherein the entire area spans an angle of at least 90° or 100°.

8. The method of claim 1, the first edge area and the second edge area each span an angle of up to 5°.

9. A vehicle, comprising: a truck with a cab and a trailer having a CMS having a single camera mounted to one side of the vehicle and being aligned according to claim 1.

10. The vehicle of claim 9, comprising the single camera at the driver side or having a single camera at each side of the vehicle.

\* \* \* \* \*